United States Patent
Ishiga

(10) Patent No.: US 8,098,305 B2
(45) Date of Patent: Jan. 17, 2012

(54) IMAGE-CAPTURING SYSTEM DIAGNOSTIC DEVICE, IMAGE-CAPTURING SYSTEM DIAGNOSTIC PROGRAM PRODUCT AND IMAGE-CAPTURING DEVICE FOR MONITORING FOREIGN MATTER

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/461,946

(22) Filed: Aug. 28, 2009

(65) Prior Publication Data
US 2009/0316002 A1 Dec. 24, 2009

Related U.S. Application Data

(60) Division of application No. 11/362,235, filed on Feb. 27, 2006, now Pat. No. 7,598,991, which is a continuation of application No. PCT/JP2004/012168, filed on Aug. 25, 2004.

(30) Foreign Application Priority Data

Aug. 29, 2003 (JP) .................................. 2003-307354

(51) Int. Cl.
H04N 9/64 (2006.01)
H04N 5/217 (2006.01)
(52) U.S. Cl. ...................... 348/247; 348/241; 248/246
(58) Field of Classification Search .................. 348/246, 348/247
See application file for complete search history.

(56) References Cited

U.S. PATENT DOCUMENTS

| 6,125,213 A | 9/2000 | Morimoto |
| 6,683,643 B1 * | 1/2004 | Takayama et al. ............. 348/247 |
| 6,791,608 B1 | 9/2004 | Miyazawa |
| 2002/0093577 A1 | 7/2002 | Kitawaki et al. |
| 2003/0133027 A1 | 7/2003 | Itoh |
| 2003/0214599 A1 | 11/2003 | Ito et al. |
| 2004/0047625 A1 | 3/2004 | Ito et al. |
| 2004/0114827 A1 | 6/2004 | Chizawa et al. |
| 2006/0115177 A1 | 6/2006 | Ishiga |

FOREIGN PATENT DOCUMENTS

| EP | 0 984 393 A2 | 3/2000 |
| JP | A-63-221766 | 9/1988 |
| JP | A-04-271663 | 9/1992 |
| JP | A-09-051459 | 2/1997 |
| JP | A-11-27475 | 1/1999 |

(Continued)

OTHER PUBLICATIONS

European Search Report dated Oct. 8, 2009.

*Primary Examiner* — Kelly L Jerabek
(74) *Attorney, Agent, or Firm* — Oliff & Berridge, PLC

(57) ABSTRACT

An image-capturing system diagnostic device includes: an image acquisition unit that obtains an image; and a monitoring unit that monitors a quantity of foreign matter present in an optical path by generating defect information indicating a defect at pixels caused by the foreign matter in the optical path based upon the image obtained by the image acquisition unit and calculating an areal ratio of defective pixels in the image based upon the defect information having been generated and issues a warning for a photographer if the areal ratio of the defective pixels exceeds a predetermined value.

8 Claims, 12 Drawing Sheets

FOREIGN PATENT DOCUMENTS

| | | |
|---|---|---|
| JP | A-2000-217039 | 8/2000 |
| JP | A-2002-374445 | 12/2002 |
| JP | A-2003-23563 | 1/2003 |
| JP | A-2003-338926 | 11/2003 |
| JP | A-2004-172835 | 6/2004 |
| JP | A-2004-222233 | 8/2004 |
| WO | WO 00/30022 A | 5/2000 |

* cited by examiner

IMAGE-CAPTURING SYSTEM DIAGNOSTIC DEVICE, IMAGE-CAPTURING SYSTEM DIAGNOSTIC PROGRAM PRODUCT AND IMAGE-CAPTURING DEVICE FOR MONITORING FOREIGN MATTER

CROSS-REFERENCE TO RELATED APPLICATIONS

This is a Division of application Ser. No. 11/362,235 filed Feb. 27, 2006, which is a Continuation of PCT Application No. PCT/JP2004/012168 filed Aug. 25, 2004. The disclosures of the prior applications are hereby incorporated by reference herein in their entirety.

BACKGROUND

The present invention relates to an image-capturing system diagnostic device, an image-capturing system diagnostic program, an image-capturing system diagnostic program product and an image-capturing device that enable optimal utilization of an electronic camera and the like.

There are methods known in the related art adopted in conjunction with OCR (optical character reader) devices, such as photocopiers, facsimile machines and scanners to diagnose the state of foreign matter buildup at the original copy reader unit. For instance, Japanese Laid Open Patent Publication No. S63-221766 discloses a method in which the level of the reflected light from the background is read and binarized before starting the original copy feed and it is judged that there is a buildup of foreign matter particles if the number of pixels determined to be black is equal to or greater than a predetermined value. In the method disclosed in Japanese Laid Open Patent Publication No. H4-271663, a prewarning display or an alert display for foreign matter buildup at a shading correcting plate that provides a reference white level for shading correction is brought up if there is a pixel with an output value obtained through a read, which is equal to or less than a predetermined value. In addition, Japanese Laid Open Patent Publication No. H11-27475 discloses a method for detecting an area with foreign matter buildup present in the optical path and physically cleaning the foreign matter buildup with compressed air.

SUMMARY

However, these references simply disclose suitable measures to be taken in the OCR device operating environment, which are not necessarily effective in applications in electronic cameras rapidly gaining popularity in recent years. Namely, it is relatively easy to diagnose the state of foreign matter particles in an OCR device, since it is irradiated with a uniform parallel light flux and thus, particle shadows always manifest in the same way without being affected by the variables related to the optical systems. In addition, only one or two particles of foreign matter are normally present in an OCR device. The problem of foreign matter buildup to be addressed in an electronic camera, which is a variable optical system, is of a different nature, since foreign matter is photographed differently depending upon the optical conditions and the number of particles tends to be extremely large.

The present invention provides a device capable of executing optimal diagnosis on the state of foreign matter buildup in an electronic camera.

According to the 1st aspect of the invention, an image-capturing system diagnostic device comprises: an image acquisition unit that obtains an image of a uniform surface photographed through an optical system with a variable aperture by setting an aperture value so as to achieve a smaller aperture state relative to a predetermined aperture value; and a monitoring unit that monitors foreign matter present in an optical path based upon the image.

According to the 2nd aspect of the invention, an image-capturing system diagnostic device comprises: an image acquisition unit that obtains an image photographed in an out-of-focus state through an optical system; and a monitoring unit that monitors foreign matter present in an optical path based upon the image.

According to the 3rd aspect of the invention, in the image-capturing system diagnostic device according to the 1st or the 2nd aspect, it is preferred that the monitoring unit monitors a quantity of foreign matter present in the optical path.

According to the 4th aspect of the invention, in the image-capturing system diagnostic device according to the 3rd aspect, it is preferred that the monitoring unit monitors the quantity of foreign matter by generating defect information indicating a defect at pixels caused by the foreign matter based upon the image obtained by the image acquisition unit and calculating an areal ratio of defective pixels in the image based upon the defect information having been generated.

According to the 5th aspect of the invention, in the image-capturing system diagnostic device according to the 4th aspect, it is preferred that if the areal ratio of the defective pixels exceeds a predetermined value, the monitoring unit issues a warning to a photographer.

According to the 6th aspect of the invention, an image-capturing system diagnostic device comprises: an image acquisition unit that obtains an image; and a monitoring unit that monitors a quantity of foreign matter present in an optical path by generating defect information indicating a defect at pixels caused by the foreign matter in the optical path based upon the image obtained by the image acquisition unit and calculating an areal ratio of defective pixels in the image based upon the defect information having been generated and issues a warning for a photographer if the areal ratio of the defective pixels exceeds a predetermined value.

According to the 7th aspect of the invention, in the image-capturing system diagnostic device according to the 5th or the 6th aspect, it is preferred that the warning prompts the photographer to physically remove the foreign matter.

According to the 8th aspect of the invention, in the image-capturing system diagnostic device according to any of the 1st through 7th aspects, it is preferred that the monitoring unit monitors the foreign matter by classifying the foreign matter into a plurality of groups.

According to the 9th aspect of the invention, in the image-capturing system diagnostic device according to the 5th or the 6th aspect, it is preferred that the monitoring unit calculates a relative ratio of a value indicated at a target pixel and an average of values at a plurality of pixels present in a predetermined range containing the target pixel for each of pixels constituting the image obtained by the image acquisition unit, generates the defect information indicating a defect in the image based upon the relative ratio and monitors the quantity of foreign matter based upon the defect information.

According to the 10th aspect of the invention, in the image-capturing system diagnostic device according to the 9th aspect, it is preferred that the monitoring unit compares the relative ratio with a plurality of threshold values, calculates areal ratios each of which corresponds to one of the plurality of threshold values and is based on pixels with relative ratios further deviating from 1 relative to one of the threshold values, and makes a decision as to whether or not an areal ratio
} having been calculated exceeds a predetermined areal ratio in correspondence to each of the plurality of threshold values.

According to the 11th aspect of the invention, in the image-capturing system diagnostic device according to the 10th aspect, it is preferred that if any of the areal ratios, each having been calculated in correspondence to one of the plurality of threshold values, exceeds the predetermined areal ratio, the monitoring unit issues a warning for the photographer.

According to the 12th aspect of the invention, in the image-capturing system diagnostic device according to the 11 th aspect, it is preferred that the monitoring unit sets the predetermined areal ratio to a smaller value if the threshold value compared with the relative ratio is set to a value smaller than 1.

According to the 13th aspect of the invention, in the image-capturing system diagnostic device according to the 1st aspect, it is preferred that the aperture value selected to achieve a smaller aperture relative to the predetermined aperture value substantially achieves a smallest aperture.

According to the 14th aspect of the invention, an image-capturing device comprises: an image-capturing unit that captures an image of a subject through an optical system with a variable aperture; a mode setting unit that selects a foreign matter monitoring mode for monitoring foreign matter within an optical path extending from the optical system to the image-capturing unit; an aperture control unit that controls the aperture at the optical system by adjusting an aperture value so as to achieve a smaller aperture relative to a predetermined aperture value when the foreign matter monitoring mode is selected; and a monitoring unit that monitors the foreign matter based upon an image captured by the image-capturing unit by setting the aperture value so as to achieve the smaller aperture relative to the predetermined aperture value at the optical system when the foreign matter monitoring mode is selected.

According to the 15th aspect of the invention, in the image-capturing device according to the 14th aspect, it is preferred that the aperture value set to achieve the smaller aperture relative to the predetermined aperture value substantially achieves a smallest aperture.

According to the 16th aspect of the invention, an image-capturing device comprises: an image-capturing unit that captures an image of a subject through an optical system; a mode setting unit that selects a foreign matter monitoring mode for monitoring foreign matter within an optical path extending from the optical system to the image-capturing unit; an instructing unit that issues an instruction for a photographer to capture an image of a subject within a close range when the foreign matter monitoring mode is selected; a focal point control unit that sets a focal point of the optical system to infinity setting when the foreign matter monitoring mode is selected; and a monitoring unit that monitors the foreign matter based upon an image obtained by the image-capturing unit by capturing an image of a subject within a close range with the focal point of the optical system set at the infinity setting when the foreign matter monitoring mode is selected.

According to the 17th aspect of the invention, an image-capturing device comprises: a focal point control unit that automatically controls a focal point of an optical system; an image-capturing unit that captures an image of a subject through the optical system; a mode setting unit that selects a foreign matter monitoring mode for monitoring foreign matter present within an optical path extending from the optical system to the image-capturing unit; and a monitoring unit that monitors the foreign matter based upon an image captured by the image-capturing unit when the foreign matter monitoring mode is selected, and: the focal point control unit switches the focal point of the optical system from an in-focus state to an out-of-focus state when the foreign matter monitoring mode is selected; and the monitoring unit monitors the foreign matter based upon an image captured by the image-capturing unit while the focal point of the optical system is set in the out-of-focus state.

According to the 18th aspect of the invention, in the image-capturing device according to any of the 15th through 17th aspects, it is preferred that the monitoring unit monitors a quantity of the foreign matter present within the optical path.

According to the 19th aspect of the invention, an image-capturing system diagnostic device, comprises: an image acquisition unit that obtains an image of a uniform surface photographed through an optical system; and a monitoring unit that monitors a quantity of foreign matter present in an optical path by classifying the foreign matter into a plurality of groups and evaluating the quantity of the foreign matter in each group based upon the image obtained by the image acquisition unit, and issues a warning for a photographer if the quantity of the foreign matter belonging to any one of the groups exceeds a predetermined value.

According to the 20th aspect of the invention, in the image-capturing device according to the 19th aspect, it is preferred that the monitoring unit classifies the foreign matter into the plurality of groups based upon degree of signal change from other uniform areas in the image obtained by the image acquisition unit.

According to the 21 st aspect of the invention, in the image-capturing device according to the 20th aspect, it is preferred that the monitoring unit sets the predetermined value to a smaller value for a group having a larger signal change from other uniform areas in the image.

According to the 22nd aspect of the invention, in the image-capturing device according to the 20th aspect, it is preferred that the monitoring unit evaluates the degree of signal change from other uniform areas by calculating a relative ratio of a value indicated at a target pixel and an average of values at a plurality of pixels present in a predetermined range containing the target pixel for each of pixels constituting the image obtained by the image acquisition unit.

According to the 23rd aspect of the invention, a computer-readable computer program product comprises an image-capturing system diagnostic program that enables a computer to execute functions of an image-capturing system diagnostic device according to any of the 1st through 13th and the 19th thorough 22nd aspects.

BRIEF DESCRIPTION OF THE DRAWINGS

FIG. 12 shows how the program may be provided in a recording medium such as a CD-ROM or through a data signal on the Internet or the like.

DETAILED DESCRIPTION OF EMBODIMENTS

First Embodiment

Figure 1:
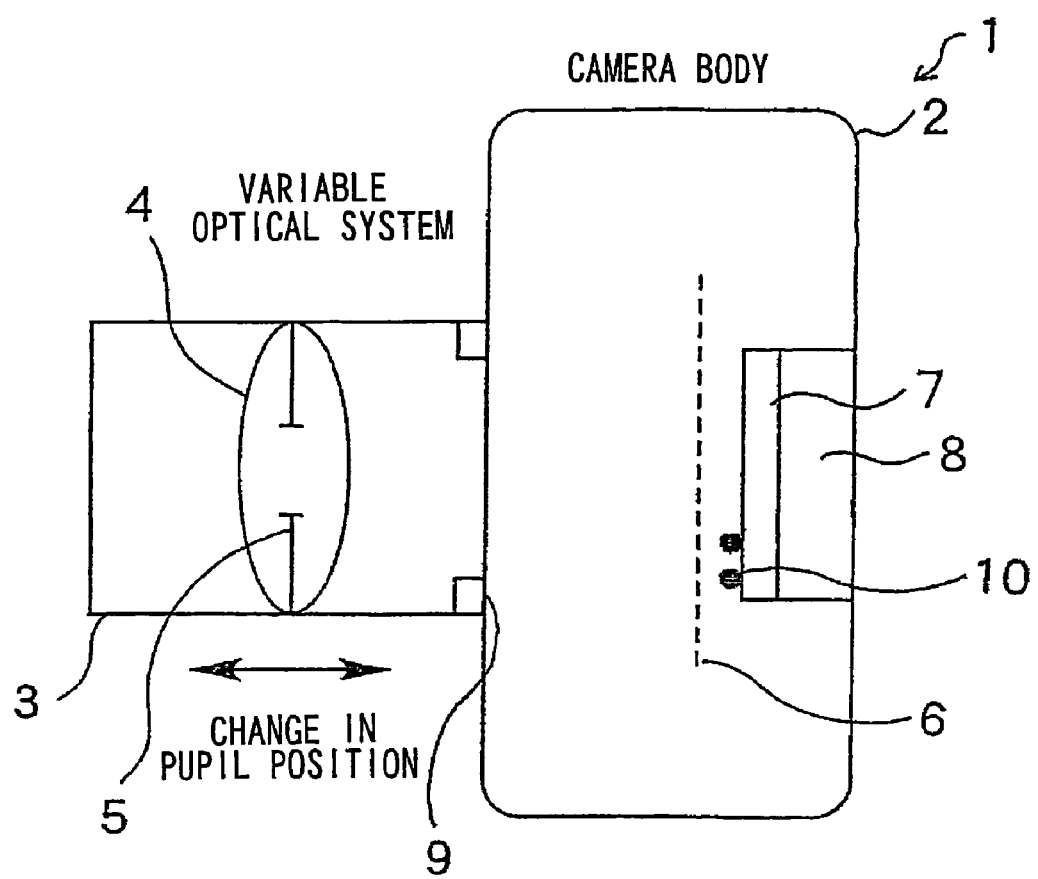
FIG. 1 shows the structure of an electronic camera that allows the use of exchangeable lenses.

In a normal operating environment, numerous dust particles or foreign matter particles are present on the surface of the optical filter disposed in front of the image sensor in an electronic camera, as shown in FIG. 1. There is a great variance in the size of such particles on the optical filter surface, and the number of small size particles may be as many as several hundred to several thousand. In a single lens reflex camera which allows the use of exchangeable lenses, in particular, the condition of foreign matter buildup changes constantly and a significant number of particles accumulate on the filter surface if the camera is left untended. Generally speaking, the transmittance at a small particle is high and such a particle occupies a small area, whereas the transmittance at a large particle is low and such a particle takes up a significant area.

The aperture value set for the photographing operation greatly affects the manner with which such particles are photographed, and if the aperture value is set further toward the open side, the image of each particle will be blurred and range over a greater area as a pale shadow, and the images of smaller particles will be attenuated to the point where they become invisible. If, on the other hand, the aperture value is set so as to reduce the opening, all the particles of foreign matter will be clearly defined in the photographed image.

Figure 11:
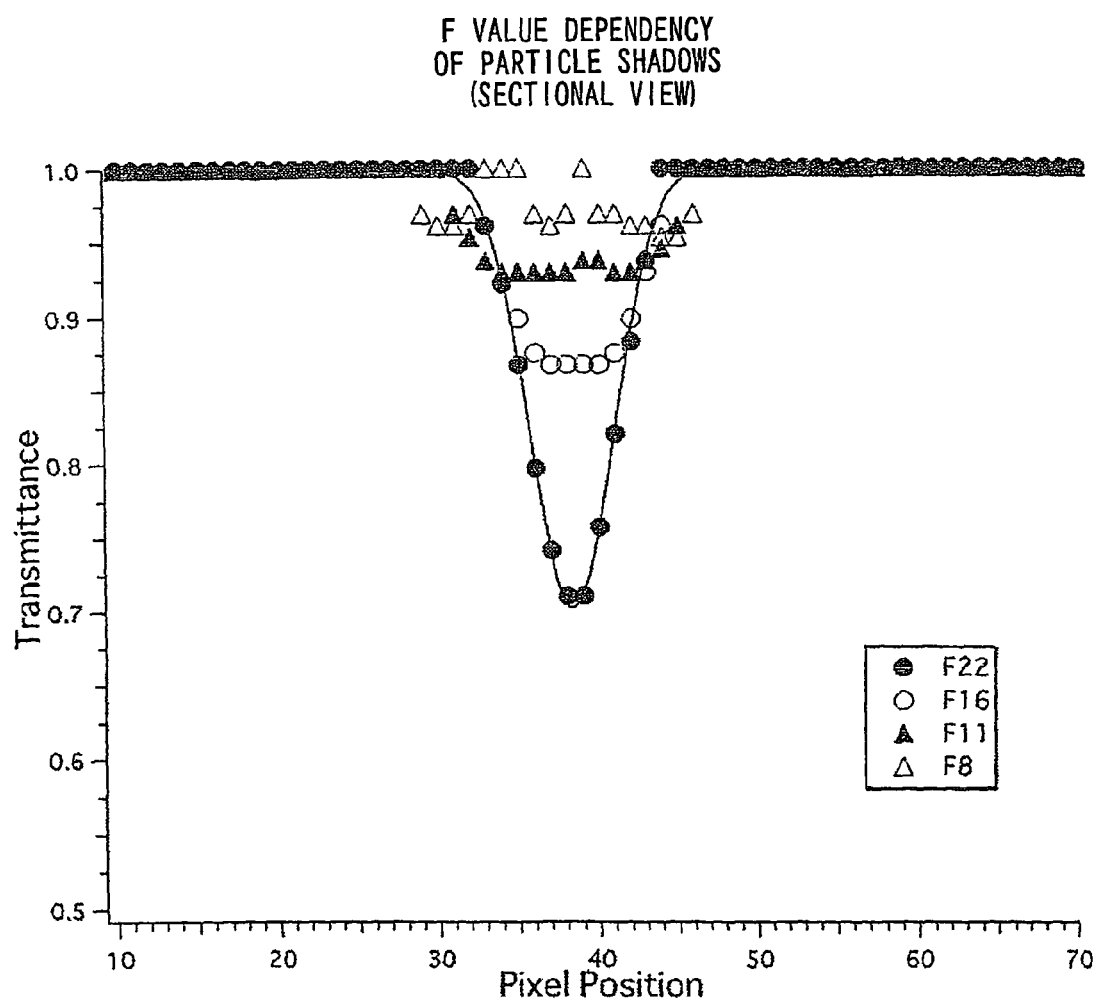
FIG. 11 illustrates the F value dependency of a relatively large particle of dust.

FIG. 11 illustrates the F value dependency of a relatively large particle of dust. A method, based upon such test results, which may be adopted to execute diagnosis of the foreign matter buildup condition by accurately monitoring particles present at the image-capturing surface, will be explained.

(Structures of Electronic Camera and Personal Computer)

FIG. 1 shows the structure of a single-lens reflex electronic still camera (hereafter referred to as an electronic camera) that allows the use of exchangeable lenses. The electronic camera 1 includes a camera body 2 and a variable optical system 3 constituted with a mount-type exchangeable lens. The variable optical system 3 includes a built-in lens 4 and a built-in aperture 5. While the lens 4 is constituted with a plurality of optical lens groups, a single representative lens is shown in the figure, and the position of the lens 4 is referred to as a main pupil position (hereafter simply referred to as a pupil position). The variable optical system 3 may be a zoom lens. The pupil position is indicated with a value determined in correspondence to the lens type or the zoom position of the zoom lens. It may be affected by the focal length, as well.

The camera body 2 includes a shutter 6, optical components 7 such as an optical filter and a cover glass, and an image sensor 8. The variable optical system 3 can be attached/detached freely at a mount unit 9 of the camera body 2. In addition, the variable optical system 3 transmits optical parameters such as information related to the pupil position and information related to the aperture value to a control unit 17 (see FIG. 2) of the electronic camera 1 via the mount unit 9. The aperture value may change within a range of, for instance, F2.8 to F22.

Reference numeral 10 indicates dust having become adhered to the surface of an optical component 7 disposed to the front of the image sensor 8. A method for diagnosing the extent of foreign matter buildup at the image-capturing surface and prompting the user to clean the surface is described below.

Figure 2:
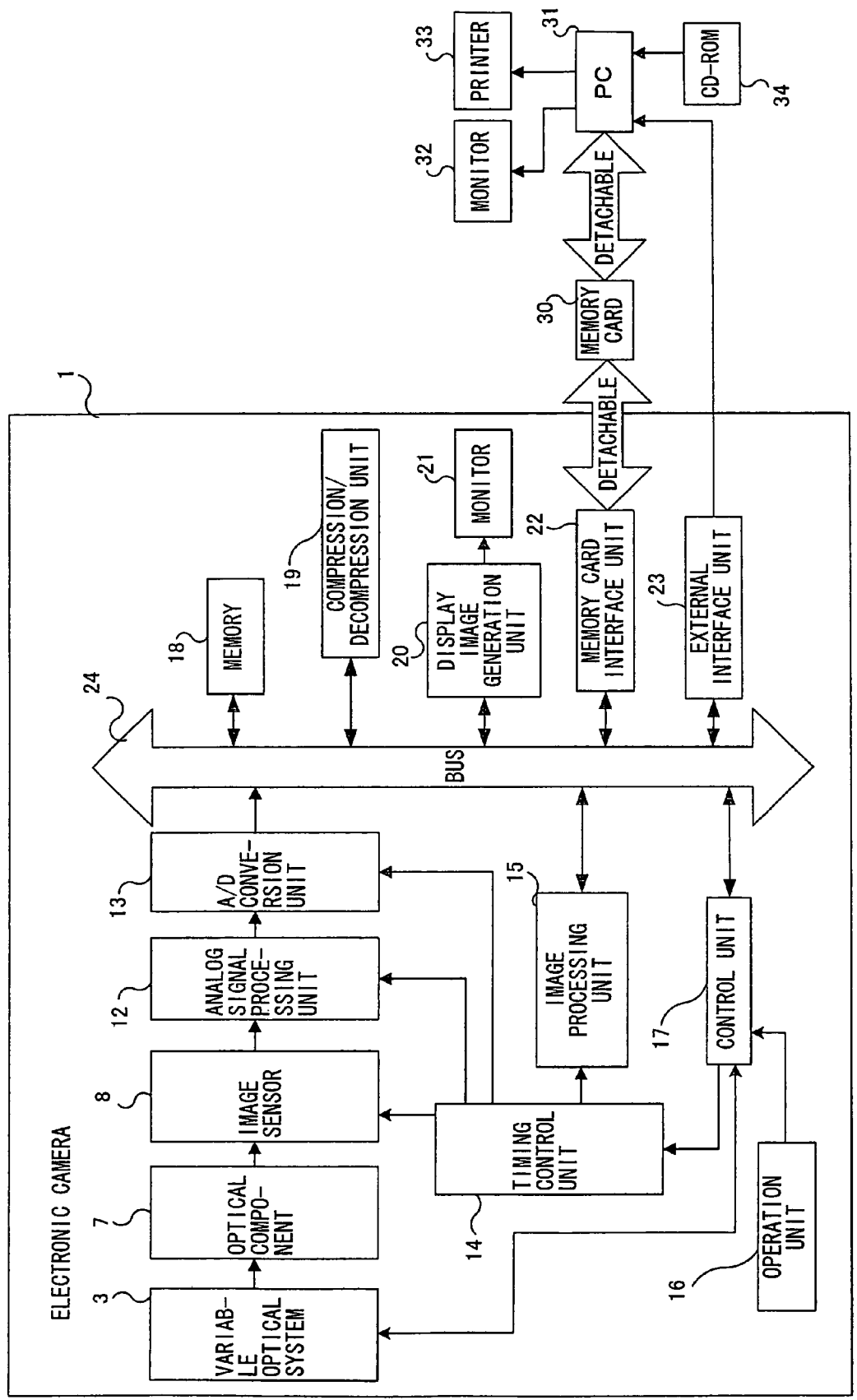
FIG. 2 shows a block diagram of the electronic camera used in conjunction with a personal computer (PC) and peripheral devices.

FIG. 2 shows a block diagram of the electronic camera 1 used in conjunction with a PC (personal computer) 31 and peripheral devices. The electronic camera 1 comprises the variable optical system 3, the optical components 7, the shutter 6 (not shown in FIG. 2), the image sensor 8, an analog signal processing unit 12, an A/D conversion unit 13, a timing control unit 14, an image processing unit 15, an operation unit 16, the control unit 17, a memory 18, a compression/decompression unit 19, a display image generating unit 20, a monitor 21, a memory card interface unit 22 and an external interface unit 23.

The image sensor 8 captures a subject image through the variable optical system 3 and outputs image signals (image-capturing signals) corresponding to the captured subject image. The image sensor 8 includes a rectangular image-capturing area constituted with a plurality of pixels and sequentially outputs analog image signals each corresponding to the electric charge having been stored at a specific pixel to the analog signal processing unit 12 in units of individual pixels. The image sensor 8 may be constituted with, for instance, a single plate-type color CCD. The analog signal processing unit 12 includes an internal CDS (correlational double sampling) circuit, an internal AGC (automatic gain control) circuit and the like, and executes a specific type of analog processing on the image signals input thereto. The A/D conversion unit 13 converts the analog signals having been processed at the analog signal processing unit 12 to digital signals. The timing control unit 14, which is controlled by the control unit 17, controls the timing with which the image sensor 8, the analog signal processing unit 12, the A/D conversion unit 13 and the image processing unit 15 are individually engaged in operation.

The memory card interface unit 22 achieves interface with a memory card (a card-type removable memory) 30. The external interface unit 23 achieves interface with an external device such as the PC 31 via a specific type of cable or a wireless transmission path. The operation unit 16 is equivalent to a shutter release button, a mode selector button and the like. At the monitor 21, various menus, a subject image captured with the image sensor 8 or an image reproduced based upon image data stored in the memory card is displayed. The output of the operation unit 16 is connected to the control unit 17, whereas the output of the display image generating unit 20 is connected to the monitor 21. The image processing unit 15 may be constituted with, for instance, a single-chip microprocessor dedicated to image processing.

The A/D conversion unit 13, the image processing unit 15, the control unit 17, the memory 18, the compression/decompression unit 19, the display image generating unit 20, the memory card interface unit 22 and the external interface unit 23 are connected with one another via a bus 24.

At the PC 31 to which a monitor 32, a printer 33 and the like are connected, an application program recorded in a CD-ROM 34 is preinstalled. In addition, the PC 31 includes a memory card interface unit (not shown) for achieving interface with the memory card 30 and an external interface unit (not shown) for achieving interface with an external device such as the electronic camera 1 via a specific type of cable or a wireless transmission path, as well as a CPU, a memory and a hard disk (not shown).

As the operator of the electronic camera 1 structured as shown in FIG. 2 selects a photographing mode and presses the shutter release button via the operation unit 16, the control unit 17 implements timing control on the image sensor 8, the analog signal processing unit 12 and the A/D conversion unit 13 via the timing control unit 14. The image sensor 8 generates image signals corresponding to an optical image formed at the image-capturing area by the variable optical system 3. The image signals then undergo a specific type of analog signal processing at the analog signal processing unit 12 and are output to the A/D conversion unit 13 as image signals having undergone the analog processing. The A/D conversion unit 13 digitizes the analog image signals and provides the resulting image data to the image processing unit 15.

It is assumed that the image sensor 8 in the electronic camera 1 achieved in the embodiment is a typical single-plate color image sensor having R (red), G (green) and B (blue) color filters disposed in a Bayer array and that the image data provided to the image processing unit 15 are expressed in the RGB colorimetric system. At each of the pixels constituting the image data, color information corresponding to a single color component among R, G and B is present. In this document, the term "pixel" referring to each of the photoelectric conversion elements constituting the image sensor 8 is also used to refer to a single unit of image data corresponding to the pixel. In addition, the description is given by adopting a concept that an image, too, is constituted with the plurality of pixels.

The image processing unit 15 executes image processing such as interpolation, gradation conversion and edge emphasis on such image data. The image data having undergone the image processing then undergo a specific type of compression processing at the compression/decompression unit 19 as required and then are recorded into the memory card 30 via the memory card interface unit 22. The image data having undergone the image processing may instead be directly recorded into the memory card 30 without having any compression processing executed on them.

It is assumed that the image data after the image processing have undergone the interpolation processing and color information corresponding to all the color components R, G and B are present at each pixel. Based upon the image data, the amount of foreign matter buildup is judged by executing a program stored in the memory 18 of the electronic camera 1 through the procedure described below. It is to be noted that the extent of foreign matter buildup may be judged by providing the image data to the PC 31 via the memory card 30 and using a program stored in the PC. Such image data may be provided to the PC 31 via the external interface 23 and a specific cable or a wireless transmission path. It is assumed that the processing is executed in conformance to a program within the camera in the embodiment.

(Particle Monitor Processing)

Figure 3:
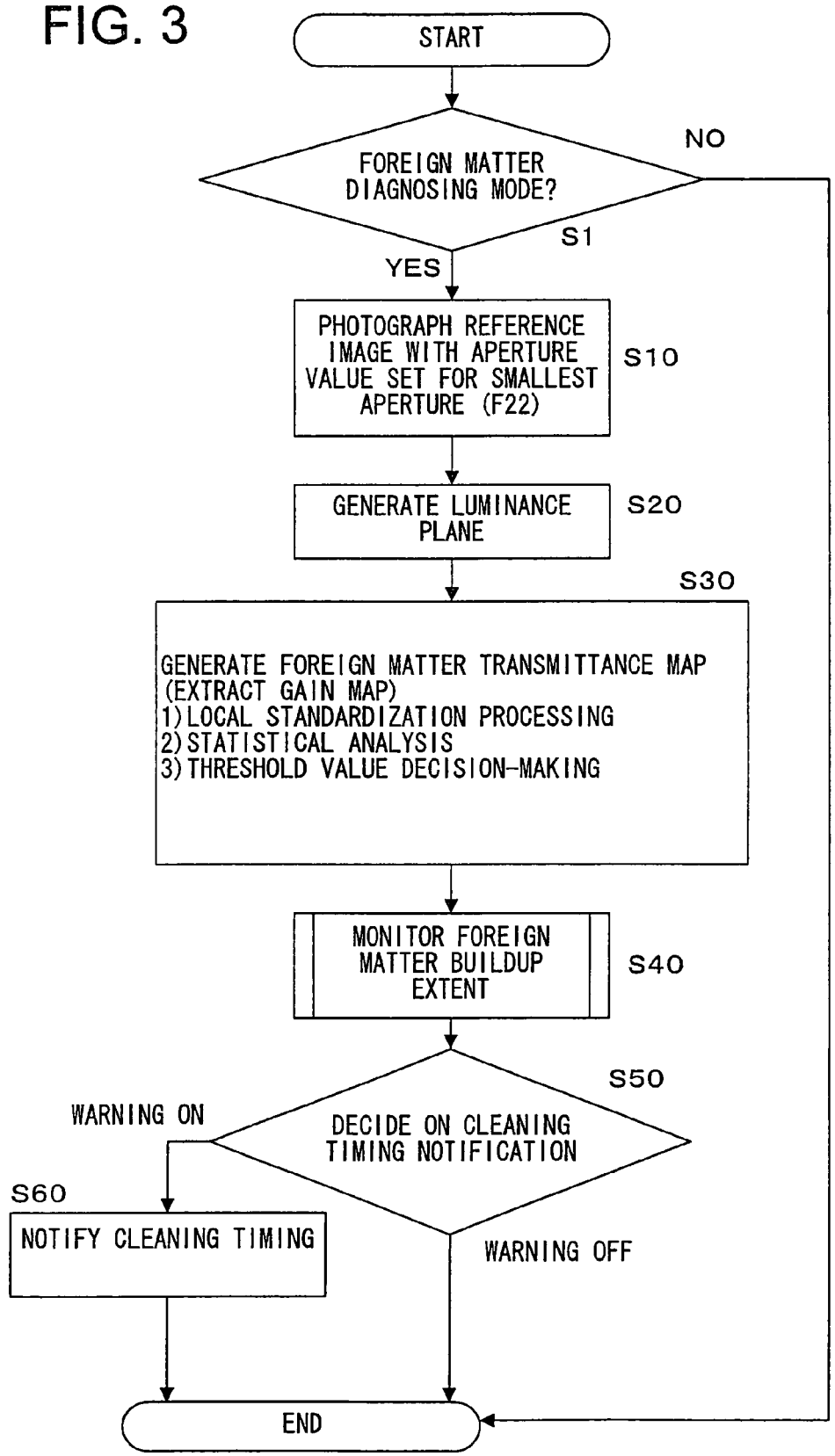
FIG. 3 presents a flowchart of the processing executed to diagnose the extent of foreign matter buildup by monitoring the state of foreign matter buildup at the image-capturing surface.

In reference to FIG. 3, the processing executed to monitor foreign matter buildup at the image-capturing surface and diagnose the extent of foreign matter buildup is explained. FIG. 3 presents a flowchart of the processing for diagnosing the extent of foreign matter buildup at the image-capturing surface or the like based upon a photographed reference image and alerting the user if the extent of foreign matter accumulation exceeds the limit for normal operation.

1) Photographing Reference Image

In step S1, a decision is made as to whether or not the electronic camera 1 is set in a "foreign matter diagnosis mode (foreign matter monitor mode)". The foreign matter diagnosis mode is selected by the user to photograph a reference image, as explained below, when executing foreign matter diagnosis for the electronic camera 1. As the foreign matter diagnosis mode is selected, the electronic camera 1 automatically selects the settings for photographing a reference image and also issues a reference image photographing instruction for the user. This instruction may be provided as a message displayed at the monitor 21 or it may be provided as an audio message.

If it is decided in step S1 that the electronic camera is set in the foreign matter diagnosis mode, the operation proceeds to step S110 to photograph a reference image. The explanation is given in reference to the embodiment by assuming that the user obtains a reference image used to check the foreign matter buildup condition by photographing a uniform subject on a regular basis (e.g., once a month). The reference image is photographed with the aperture automatically set smaller from a predetermined aperture value within the variable range available in the variable optical system 3. It is desirable that the aperture be set smaller than the predetermined aperture by selecting an aperture value corresponding to the smallest possible aperture so as to enable accurate judgment with regard to the extent of foreign matter buildup based upon information on the image with all the particles most clearly photographed therein, which will be obtained at such a setting. It is to be noted that the aperture value corresponding to the smallest possible aperture is approximately F22 when a standard lens is used. In addition, as long as the aperture is reduced to a state corresponding to the aperture value of F11, for instance, a substantially accurate foreign matter diagnosis is enabled. The aperture value corresponding to the smallest possible aperture may be set manually by the user. Here, the reference image is not required to be constituted with completely uniform white reference data but can be obtained by photographing a subject that is readily accessible such as blue sky, a substantially uniform wall surface, a gray chart or a solid paper surface. The reference data used in the embodiment may contain vignetting at the lens, subject gradation, shading at the image sensor and the like. It is assumed that readily available reference data that can be obtained with ease through a photographing operation performed at a convenient location are used, and the reference data do not need to be perfectly uniform, since uniformity is achieved through conversion executed by using an algorithm in the image processing.

2) Generation of Luminance Plane

Next, in step S20, a luminance plane is generated. A luminance signal is generated based upon the R, G and B signals by using the following expression (1) for each pixel [i,j] constituting the reference image data. [i,j] indicates the position of the specific pixel.

$$Y[i,j]=(R[i,j]+2*G[i,j]+B[i,j])/4 \quad (1)$$

While the R, G and B planes may be individually analyzed, the adverse effect of particle shadows basically manifests simply as signal attenuation, regardless of the color component. Accordingly, the R, G and B signals are converted to a luminance component that enables effective use of all the available information and can be used to reduce the adverse effect of random noise. In addition, since only the single luminance component plane instead of the three planes, i.e., the R, G and B planes, needs to be analyzed, the processing can be speeded up. The luminance component generation ratios are not limited to those in the expression above and they may be set to R:G:B=0.3:0.6:0.1, instead.

3) Generation of Transmittance Map (Gain Map Extraction)

In step S30, a transmittance map is generated (gain map extraction) by executing the following processing.

3-1) Local Standardization Processing (Gain Extraction Processing)

As described earlier, the reference image data do not necessarily achieve perfect uniformity. For this reason, the luminance plane having been generated does not achieve perfect uniformity, either. A transmittance signal T[i,j] is calculated as expressed in (2) below for each of the pixels in such a luminance plane by locally standardizing (normalizing) the pixel value. Namely, the relative ratio of the value indicated for the target pixel [i,j] and the average pixel value taken over a local range containing the pixel is calculated for each pixel. Through this processing, any non-uniformity such as gradation and shading contained in the uniform surface data is algorithmically eliminated in a desirable manner and, as a result, the extent to which the transmittance has been lowered due to a particle shadow alone can be extracted. The transmittance values over the entire image plane determined as described above are referred to as a transmittance map (gain map). The transmittance map contains defect information indicating defects in the reference image. It is to be noted that a pixel value is a value indicated by a color signal (color information) corresponding to a specific color component or by a luminance signal (luminance information) generated at each pixel. For instance, when the data are expressed with one byte, the pixel value assumes a value within a range of 0 to 255.

$$T[i, j] = \frac{Y[i, j]}{\left(\sum_{m=i-a}^{i+a} \sum_{m=j-b}^{j+b} Y[i+m, j+n]\right) / (2a+1)(2b+1)} \quad (2)$$

The local average should be calculated over a range of (2a+1)×(2b+1) pixels, which ranges over an area greater than the area that would be occupied by the largest conceivable particle. Ideally, the local average should be calculated over a range having an area approximately 3 times the area of the particle shadow to obtain accurate transmittance data. "a" represents the number of pixels disposed to the left and to the right relative to the target pixel [i,j] and b represents the number of pixels disposed further upward and downward relative to the target pixel [i,j]. For instance, assuming that the pixels are disposed with a 12 μm pitch at the image sensor 8 and that the distance between the image-capturing surface and the surface having the dust adhered thereto is 1.5 mm, the diameter of a large particle shadow is equivalent to approximately 15 pixels when photographed with the aperture value set to F22 and the diameter of the large particle shadow is equivalent to approximately 40 pixels with the aperture value set to F4. Accordingly, it is desirable to set both "a" and "b" to 40 so as to take the local average over an 81×81 pixel range. In addition, the range of size may be fixed at 101×101 pixels in conjunction with image sensors in several million pixels. However, these are simply examples, and the local average may be calculated over a pixel range containing a different number of pixels.

The extent to which particle shadows manifest is greatly dependent upon the aperture value, and the shadow of a very small foreign matter particle disappears as soon as the aperture is opened. However, the shadow of a large foreign matter particle may still occupy a large area although the shadow itself is lightened even when the aperture is set to the open side. Depending upon the pixel pitch width at the image sensor, a round particle shadow ranging over several tens of pixels may manifest even when the aperture is set to the open side. In such a case, it is necessary to calculate the local average over a very large range. For this reason, the processing may be executed by using representative pixels selected through sub-sampling if the processing needs to be expedited.

Figure 4:
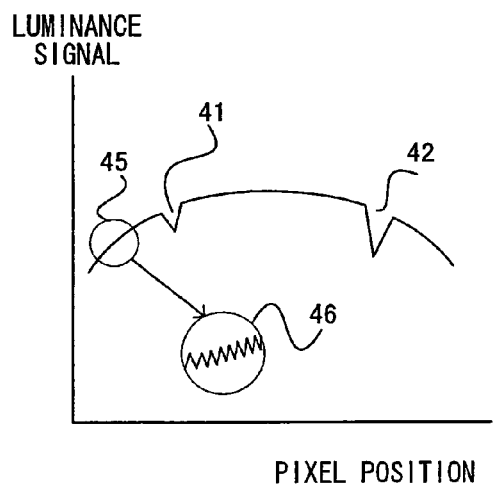
FIGS. 4A and 4B illustrate the local standardization processing executed on the luminance plane.
Figure 4:
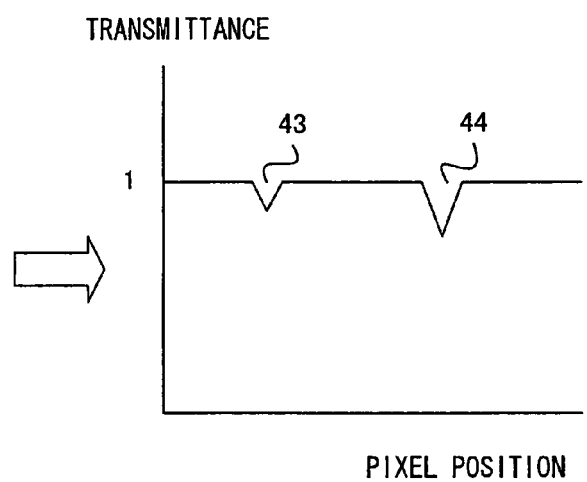

The processing executed to calculate the relative ratio over the (2a+1)×(2b+1) pixel range is referred to as local standardization processing (gain extraction processing). The filter used to calculate the relative ratio over the (2a+1)×(2b+1) pixel range may be referred to as a gain extraction kernel. FIGS. 4A and 4B show how the local standardization processing is executed on the luminance plane. FIG. 4A shows the luminance signals at pixels disposed along the horizontal direction within the luminance plane, with reference numerals 41 and 42 indicating that the presence of dust has lowered luminance signal values. FIG. 4B shows the results of the local standardization processing described above executed on the luminance signals in FIG. 4A. Namely, it shows the results of the standardization processing executed on the pixel values over the local range. Reference numerals 43 and 44 respectively correspond to reference numerals 41 and 42 in FIG. 4A, each indicating the transmittance at a point at which dust is present. Non-uniformity such as gradation and shading contained in the uniform surface data is thus eliminated, and the extent to which the transmittance has been lowered due to the particle shadows alone can be extracted. As a result, the positions at which the dust is present and the specific levels of transmittance at the individual positions can be ascertained at the same time.

While low pass processing on the transmittance map may be optional, it is more desirable to execute this processing, since it is mostly highly effective. Since the transmittance signal T[i,j] contains random noise attributable to the quantum fluctuation of the luminance signal, a particle shadow may be detected as mottling over an area where the transmittance is at a level close to 1 and a subtle effect of the particle shadow remains due to the randomness of the noise, if the threshold value decision-making in 3-3) below is executed directly on the transmittance map. The appearance of the image can be somewhat improved by grouping the mottled particle shadow through low pass filter processing expressed as in (3) below.

$$T[i,j]=\{4*T[i,j]+2*(T[i-1,j]+T[i+1,j]+T[i,j-1]+T[i,j+1])+1*(T[i-1,j-1]+T[i-1,j+1]+T[i+1,j-1]+T[i+1,j+1])\}/16 \quad (3)$$

3-2) Statistical Analysis of Transmittance Map

Next, in order to distinguish the particle information in the transmittance map from random noise, a statistical analysis is executed by calculating an average value M as expressed in (4) below over the entire image plane of the transmittance map obtained through the local standardization processing described earlier and then calculating a standard deviation σ as expressed in (5) below. It is to be noted that Nx and Ny respectively indicate the total numbers of pixels present along the x direction and the y direction.

$$M = \frac{1}{N_x N_y} \sum_{i,j} T[i, j] \quad (4)$$

$$\sigma = \sqrt{\frac{1}{N_x N_y} \sum_{i,j} (T[i, j] - M)^2} \quad (5)$$

3-3) Threshold Value Decision-Making

Figure 5:
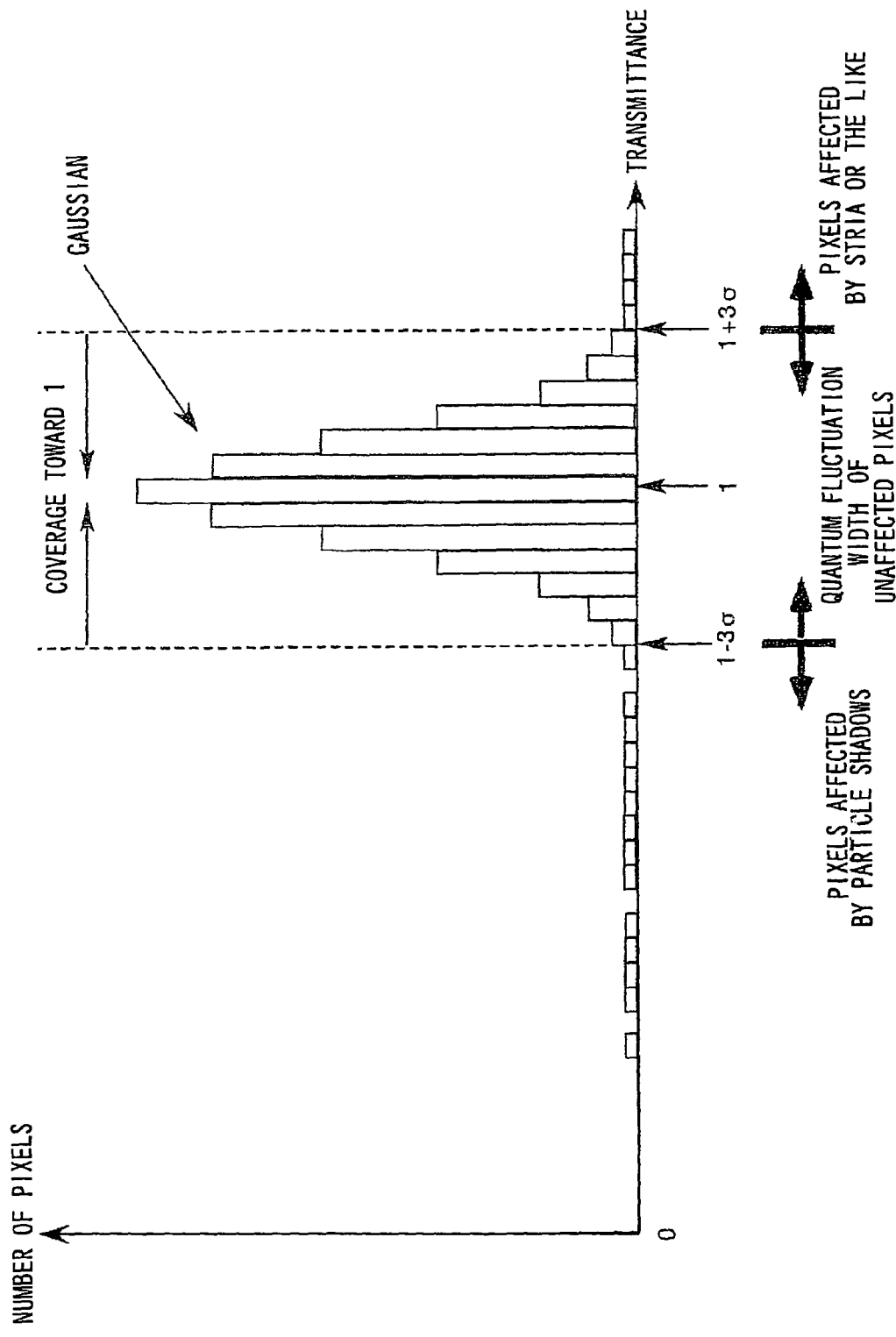
FIG. 5 shows a histogram of the transmittance map.

The areal ratio of dust signals in the transmittance map is basically very small, and the results of the statistical analysis executed as described in 3-2) reflect the evaluation of the random noise (shot noise) attributable to the quantum fluctuations of the transmittance signals. Reference numeral 46 in FIG. 4, which is an enlargement of an area indicated with reference numeral 45, indicates manifestation of fine random noise. A histogram of the transmittance map shows a normal distribution of the standard deviation σ around the average value M (M is a value very close to 1). FIG. 5 shows the histogram of the transmittance map. Since the fluctuations in this range are considered to be unaffected by the change in the transmittance attributable to particle shadows, the transmittance may be forcibly set to 1. Namely, threshold value decision-making is executed in conformance to the conditions expressed in (6) and (7) below $$\text{if } |T[i,j]-M| \leq 3\sigma \text{ then } T[i,j]=1 \tag{6}$$

$$\text{else } T[i,j]=T[i,j] \tag{7}$$

Since 99.7% of the normally distributed random data concentrate within the range of ±3 σ, the effect of the random noise can be eliminated with a fair degree of accuracy by processing the data in this range. Any signal indicating a transmittance value outside the ±3 σ range, which cannot be attributed to a statistical error, is an abnormal signal considered to indicate a phenomenon caused by a lowered transmittance due to a particle shadow. If a particle shadow is present in such an abnormal area, the transmittance normally indicates a value smaller than 1.

However, the transmittance may indicate a value greater than 1 although this does not happen very often. Such a phenomenon is not due to particle shadows and is observed when, for instance, interference fringes, which manifests as the incident light is intensified or attenuated, are induced by a defect attributable to a stria (non-uniformity in the refractive index) of the optical low pass filter or the like. For this reason, the method according to the present invention can be adopted to detect a defect other than dust present at an optical member disposed in the optical path. In addition, the adverse effect of a defect at a pixel in the image sensor, too, can be detected through the method. While dust present at a position close to the image sensor 8 tends to appear with more clarity without becoming blurred, even dust present on the photographic lens, which is bound to appear fairly blurred in the photographed image, can be detected with a high level of accuracy.

It is to be noted that the threshold value decision-making should be executed in conformance to the conditions expressed as in (8), (9) and (10) below if the adverse effect of particle shadows alone needs to be addressed.

$$\text{if } |T[i,j]-M| \leq 3\sigma \text{ then } T[i,j]=1 \tag{8}$$

$$\text{else if } T[i,j]>1 \text{ then } T[i,j]=1 \tag{9}$$

$$\text{else } T[i,j]=T[i,j] \tag{10}$$

Since the average value M used in the decision-making always takes a value close to 1, the value 1 may substitute for M.

Through the processing described above, two types of defect information, i.e., map information indicating defective pixel positions (obtained by making a decision as to whether or not T=1) and transmittance information indicating the degree of each defect, can be obtained at once. It is to be noted that the transmittance map described above, which indicates the local relative gains, may be alternatively referred to as a gain map.

Under normal circumstances, a defect such as the presence of dust is detected by using a differential filter for edge detection. However, dust present within the optical path becomes optically blurred and manifests as a particle shadow having extremely low contrast with the surrounding area. In such a case, the sensitivity of the differential filter is often not even close to being high enough and the low contrast particle shadow can hardly be detected. By adopting the decision-making method based upon the statistical characteristics of the transmittance described above, however, an extremely high sensitivity dust detection is enabled.

4) Monitoring Foreign Matter Buildup

Figure 6:
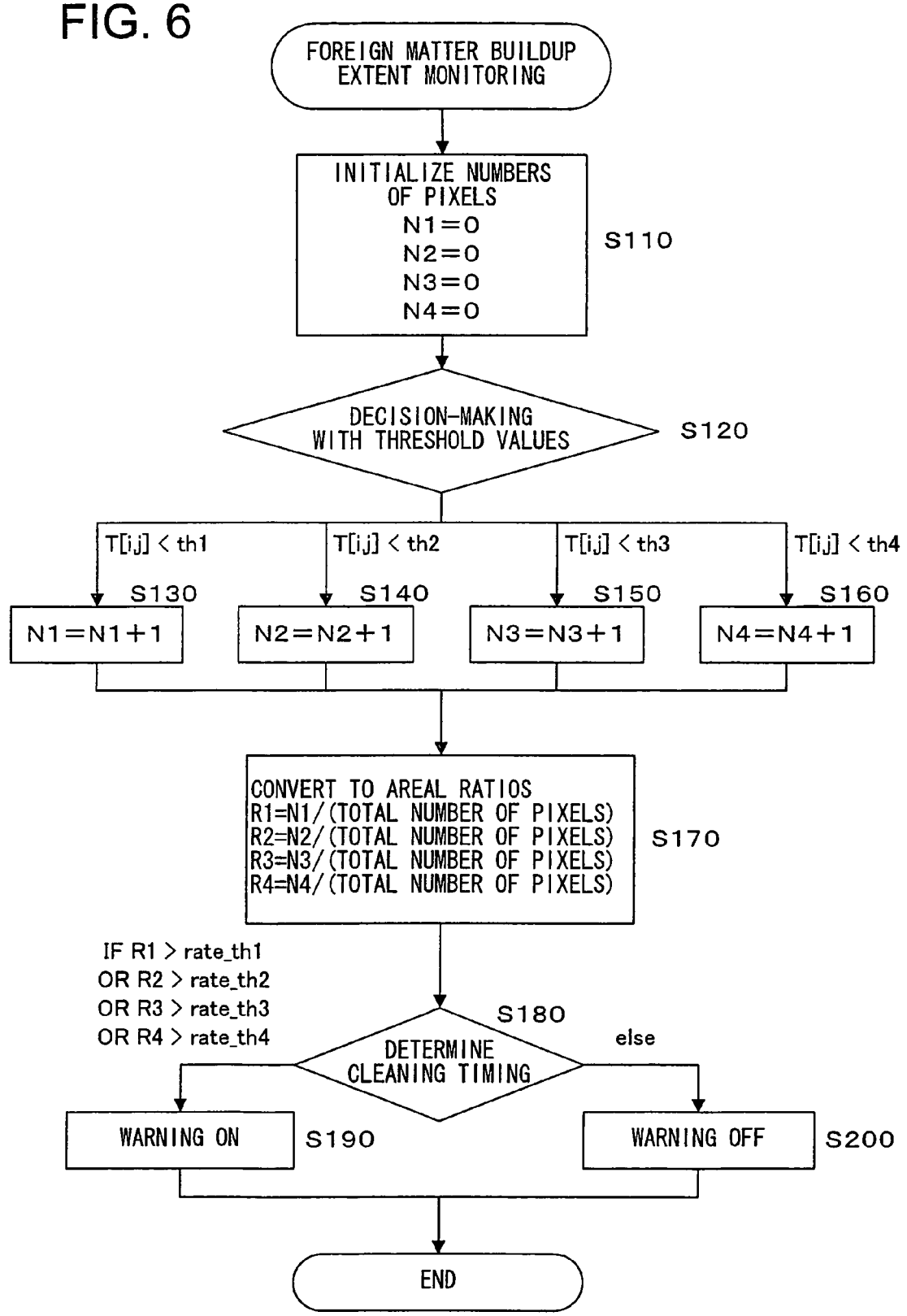
FIG. 6 presents a flowchart of the foreign matter accumulation monitor processing.
Figure 7:
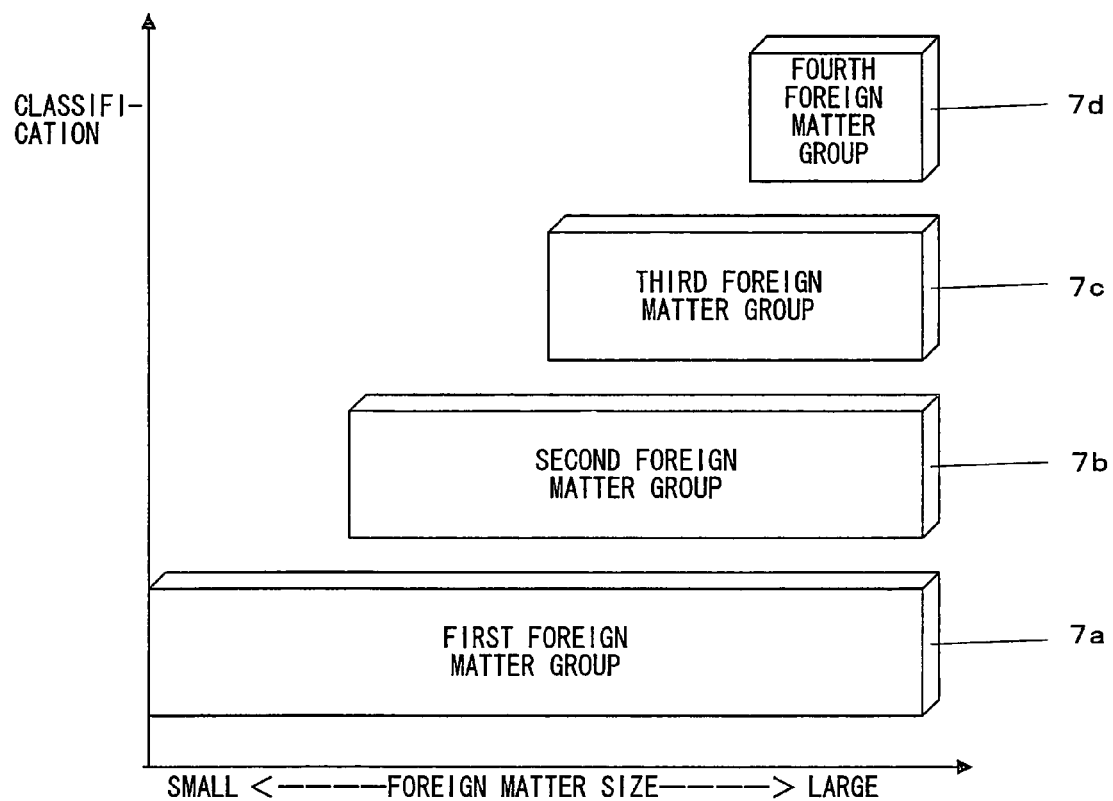
FIG. 7 shows foreign matter size classification.

In step S40, the extent of foreign matter accumulation is monitored as shown in the flowchart presented in FIG. 6. The number of pixels affected by the presence of foreign matter is counted by using the transmittance map having been detected with high sensitivity as described earlier, and the areal ratio of those pixels to the total number of pixels is calculated. At this time, each particle of dust is classified as a specific type based upon the transmittance, and the areal ratio of each dust particle is calculated. In this example, particles of foreign matter are sorted into the four groups in FIG. 7 in correspondence to the sizes of the foreign matter buildup. All the particles of foreign matter including the smallest to the largest belong in a first foreign matter group 7a, with N1 representing the number of pixels assumed to be affected by the particles in the first foreign matter group 7a. Particles excluding extremely small particles in the first foreign matter group 7a are further classified as a second foreign matter group 7b, with N2 representing the number of pixels assumed to be affected by the particles in the second foreign matter group 7b. Particles excluding small particles in the second foreign matter group 7b are further classified as a third foreign matter group 7c, with N3 representing the number of pixels assumed to be affected by the particles in the third foreign matter group 7c. A fourth foreign matter group 7d includes only large particles of foreign matter, with N4 representing the number of pixels assumed to be affected by the particles in the fourth foreign matter group 7d. Since the size of a particle can be assumed to be smaller if the transmittance is reduced to a lesser extent, a smaller size particle can be included in a given group by selecting a value closer to 1 for the corresponding threshold value, as explained below.

4-1) Initialization

In step S110 in FIG. 6, the numbers of pixels affected by the foreign matter in the various groups are initialized so that N1=0, N2=0, N3=0 and N4=0.

4-2) Calculation of Numbers of Pixels Affected by Foreign Matter

In step S120, decision-making with regard to the transmittance is executed by using threshold values as indicated in conditional expressions (11), (12), (13) and (14) below, and the number of pixels N1 affected by the first foreign matter group is calculated (step S130), the number of pixels N2 affected by the second foreign matter group is calculated (step S140), the number of pixels N3 affected by the third foreign matter group is calculated (step S150) and the number of pixels N4 affected by the fourth foreign matter group is calculated (step S160), as expressed in (11), (12), (13) and (14) based upon the results of the decision-making executed in step S120. The transmittance threshold values used in this process may be set so that th1=0.95, th2=0.75, th3=0.50 and th4=0.25, for instance. By setting the threshold values to such specific values and counting their quantities of particles, N1, N2, N3 and N4 can be calculated respectively in correspondence to the first foreign matter group 7a, the second foreign matter group 7b, the third foreign matter group 7c and the fourth foreign matter group 7d into which the particles have been classified based upon their sizes.

if $T[i,j]<th1$ then $N1=N1+1$     (11)(1st foreign matter group)

if $T[i,j]<th2$ then $N2=N2+1$     (12)(2nd foreign matter group)

if $T[i,j]<th3$ then $N3=N3+1$     (13)(3rd foreign matter group)

if $T[i,j]<th4$ then $N4=N4+1$     (14)(4th foreign matter group)

It is to be noted that the number of pixels affected by stria and the like can be calculated, as has been explained in reference to FIG. 5, and thus defects in the optical members other than foreign matter in the optical path can also be detected by selecting a value greater than 1 for each of the threshold values th1, th2, th3 and th4 and ensuring that any transmittance with a value greater than the threshold value, i.e., with a value further deviating from 1 is detected.

4-3) Conversion to Areal Ratios

Based upon N1, N2, N3 and N4 calculated as described above, the numbers of pixels affected by the foreign matter in the individual foreign matter groups are converted to areal ratios. The areal ratios corresponding to the individual groups, i.e., R1 representing the areal ratio of the first foreign matter group, R2 representing the areal ratio of the second foreign matter group, R3 representing the areal ratio of the third foreign matter group and R4 representing the areal ratio of the fourth foreign matter group are calculated as expressed in (15), (16), (17) and (18) below.

$R1=N1/$(total number of pixels)     (15)

$R2=N2/$(total number of pixels)     (16)

$R3=N3/$(total number of pixels)     (17)

$R4=N4/$(total number of pixels)     (18)

As a result, the extent of foreign matter buildup can be monitored by classifying particles into a plurality of groups. R4 indicates the extent of accumulation of very large-size foreign matter alone, whereas R1 indicates the extent of accumulation of all the foreign matter from extremely small particles to large particles.

5) Notification of Cleaning Timing

The user is notified if any of the extents of foreign matter accumulation corresponding to the various foreign matter groups calculated in step S170 exceeds the limit beyond which problems arise during regular operation. In step S180, decision-making is executed as indicated in conditional expressions (19) and (20) below.

if ($R1$>rate_th1 OR $R2$>rate_th2 OR $R3$>rate_th3 OR $R4$>rate_th4)

then, warning ON     (19)

else warning OFF     (20)

If any of the foreign matter accumulation extents are judged to meet the corresponding condition through the decision-making, it is decided that a warning is to be issued for the user in step S190 (hereafter described as "warning ON"), whereas if none of the foreign matter accumulation extents meets the corresponding condition, it is decided not to issue a warning in step S200 (hereafter described as "warning OFF").

It is desirable to select a value on the order of 0.1% for rate_th1, a value on the order of 0.01 to 0.001% for rate_th4 and values in between for rate_th2 and rate_th3. Namely, a greatest threshold value should be selected for the areal ratio of the first foreign matter group and threshold values for the areal ratios of the second, third and fourth foreign matter groups should show a gradual decline, since the reference image has been photographed with the aperture value set for the smallest aperture opening and smaller particles of foreign matter are likely to disappear simply by setting the aperture slightly toward the open side. In other words, the threshold value should be set so as to enable decision-making by taking into consideration that extremely small particles of foreign matter appearing in the reference image are not likely to adversely affect the image quality if an image is photographed through regular operation by setting the aperture slightly larger than the smallest setting.

If a warning ON decision is made in step S190, a warning for the user prompting foreign matter removal is issued in step S60 in FIG. 3. This warning means that unless the foreign matter is physically removed, the quality of an image output in the electronic camera is bound to be significantly compromised. Such a warning may be provided by disposing a warning lamp at the electronic camera 1 and flashing the warning lamp, or by displaying a message at the monitor 21 prompting cleaning. Alternatively, it may be provided as an audio message.

As described above, while the extent of foreign matter accumulation is calculated by using a reference image, the surface photographed to obtain the reference image itself does not need to achieve an extremely high level of uniformity and thus, the reference image can be acquired with relative ease in the first embodiment. In addition, foreign matter can be detected with greatly improved sensitivity compared to the sensitivity of the foreign matter detection in the related art.

Second Embodiment

In the second embodiment, instead of the reference image obtained by photographing a uniform surface in the first embodiment, an image photographed by adjusting the focus at an out-of-focus point (hereafter referred to as an unfocused image) is used to calculate the extent of foreign matter accumulation and warn the user as necessary if the extent of foreign matter accumulation exceeds the limit beyond which problems are likely to occur in regular operation.

(Structures of Electronic Camera and Personal Computer)

The structures of the electronic camera 1 and the PC 31 functioning as an image processing apparatus are explained in reference to FIG. 2. It is to be noted that components identical to those in the first embodiment are not explained.

The electronic camera 1 includes an autofocus control unit (not shown). The autofocus control unit, which is controlled by the control unit 17, detects the distance to the subject and the focal point position for the subject and controls the variable optical system 3 so as to automatically adjust the focal point, based upon the detection results. In an electronic camera, the distance to and the focal point position for the subject are usually detected by driving the focus lens (focusing optical system) (not shown) forward/backward to determine a position at which high contrast is achieved and designating the high-contrast position as the in-focus point. By controlling the variable optical system 3 so as to achieve focus at the in-focus point thus determined, a focused image can be obtained. It is to be noted that the method described above through which the position of high contrast is designated as the in-focus point simply represents an example and another type of autofocus mechanism may be employed.

In this embodiment, an unfocused image is obtained by issuing an instruction for the user to photograph an object present within close range, i.e. present close to the user, and controlling the position of the focus lens so as to move it to an out-of-focus match position, away from the position set by the autofocus control unit through autofocus operation or away from a position toward the in-focus side if no in-focus position is present, i.e., toward the infinity side further away from the in-focus side.

(Foreign Matter Monitor Processing)

Figure 8:
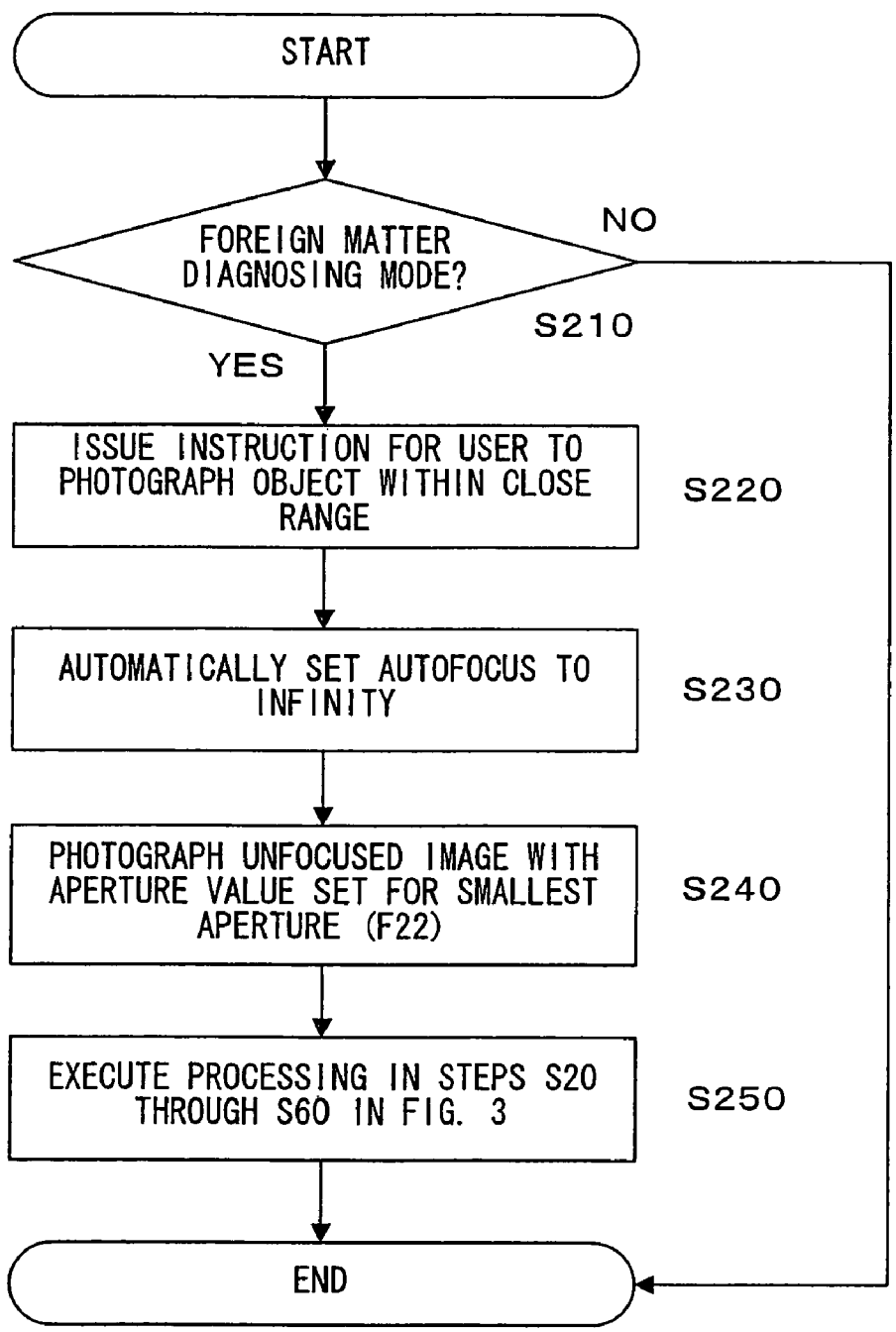
FIG. 8 presents a flowchart of unfocused image photograph processing executed in a second embodiment.

In reference to FIG. 8, the processing executed to monitor the foreign matter built up at the image-capturing surface and diagnose the extent of foreign matter buildup is explained. FIG. 8 presents a flowchart of the processing executed to diagnose the extent of foreign matter buildup at the image-capturing surface based upon the unfocused image having been obtained through photographing operation and to issue a notification for the user if the extent of foreign matter accumulation exceeds the limit beyond which problems occur in regular operation. The processing described below is executed in conformance to a program stored in the memory 18 of the electronic camera 1.

1) Photographing Unfocused Image

Following step S210, in which a decision is made as to whether or not the foreign matter diagnosis mode is currently set, an unfocused image is photographed through the procedure described below. The term "unfocused image" normally means an image photographed by adjusting the focal point on the opposite side from the in-focus side determined through autofocus or an image obtained by photographing a subject present within a distance smaller than the minimum photographing distance over which no in-focus point is present. Such an unfocused, blurred image, equivalent to the reference image used in the first embodiment, can be obtained even if there is no uniform subject nearby. As is the reference image explained earlier, the unfocused image should be photographed with the aperture set to the smallest opening within the variable range available in the variable optical system 3. The aperture value corresponding to the smallest possible aperture is approximately F22 when a standard lens is used. Thus, accurate judgment with regard to foreign matter buildup based upon information on the image with all the particles of foreign matter most clearly photographed therein, is enabled.

In step S220, the electronic camera 1 issues an instruction for the user to photograph an object present close to the user. This instruction for the user may be issued as a message displayed at the monitor 21 or as an audio message. In order to ensure that the decision to photograph an unfocused image is made in step S210, the user needs to issue an unfocused image photographing instruction for the electronic camera 1. Such an instruction may be provided by setting the "foreign matter diagnosis mode" or an "unfocused image photographing mode" in a menu screen in the electronic camera 1. As the user starts either mode, a decision to photograph an unfocused image can be made.

The object present within close range photographed to an unfocused image is a subject present within a distance smaller than the minimum photographing distance or the closest range. The term "minimum photographing distance" refers to the minimum distance limit over a distance smaller than which no in-focus point exists, and the minimum photographing distance takes on varying values in correspondence to individual lenses. Since the minimum photographing distance is normally approximately 20 cm or greater, a desirable blurred image can be obtained as the unfocused image, equivalent to the reference image, by photographing a subject present at a range of 2~10 cm even when a wide angle lens is used.

In step S230, the electronic camera 1 automatically selects "infinity" for autofocus via the autofocus control unit. Since an instruction for photographing the object present within close range has been issued for the user in step S220, an unfocused image, which is unfocused to begin with and is further blurred through focal point control along the opposite direction relative to the subject, can be photographed. Then, in step S240, the unfocused image is photographed.

Based upon the unfocused image obtained through the procedure described above, the extent of foreign matter buildup is detected and the user is provided with a cleaning timing notification. Since the unfocused image is equivalent to the reference image used in the first embodiment, as explained above, the subsequent processing is identical to the processing executed in the first embodiment. Namely, the extent of foreign matter buildup is detected and the user is provided with a cleaning timing notification by generating a luminance plane in step S20, generating a transmittance map in step S30, monitoring the extent of foreign matter buildup in step S40, making a decision as to whether or not to issue a cleaning timing notification in step S50 and issuing a cleaning timing notification in step S60, as in the first embodiment.

As described above, in the second embodiment in which the extent of foreign matter accumulation is calculated by using an unfocused image, a blurred image equivalent to the reference image used in the first embodiment can be obtained even when there is no uniform subject nearby, allowing the user to detect foreign matter at any location. In addition, as in the first embodiment, foreign matter can be detected with greatly improved sensitivity compared with the sensitivity of a foreign matter detection in the related art.

Third Embodiment

In the second embodiment, the unfocused image is obtained by issuing an instruction for the user to photograph an object present within close range and adjusting the autofocus toward the out-of-focus side, i.e., toward the infinity side. If the photographer photographs an object present over a significant distance in spite of the instruction to photograph the object present within close range, an in-focus state will be achieved and thus, a suitable unfocused image to be used to monitor the extent of foreign matter buildup will not be obtained. A method of control through which an unfocused image can be automatically obtained under such circumstances, i.e., an in-focus state is achieved despite an autofocus adjustment toward the infinity side, by setting the autofocus on the side opposite from the infinity side, i.e., toward the close-up (minimum photographing distance) side via the autofocus control unit is explained in reference to the third embodiment.

(Structures of Electronic Camera and Personal Computer)

The electronic camera 1 and the PC 31 functioning as an image processing apparatus adopt structures identical to those in the second embodiment, and for this reason, their explanation is omitted.

In the embodiment, an unfocused image is obtained by controlling the position of the focus lens via the autofocus control unit so as to move it from the autofocus position to an out-of-focus position on the opposite side, i.e., from the autofocus position toward a position on the infinity side or on the close-up side.

(Foreign Matter Monitor Processing)

Figure 9:
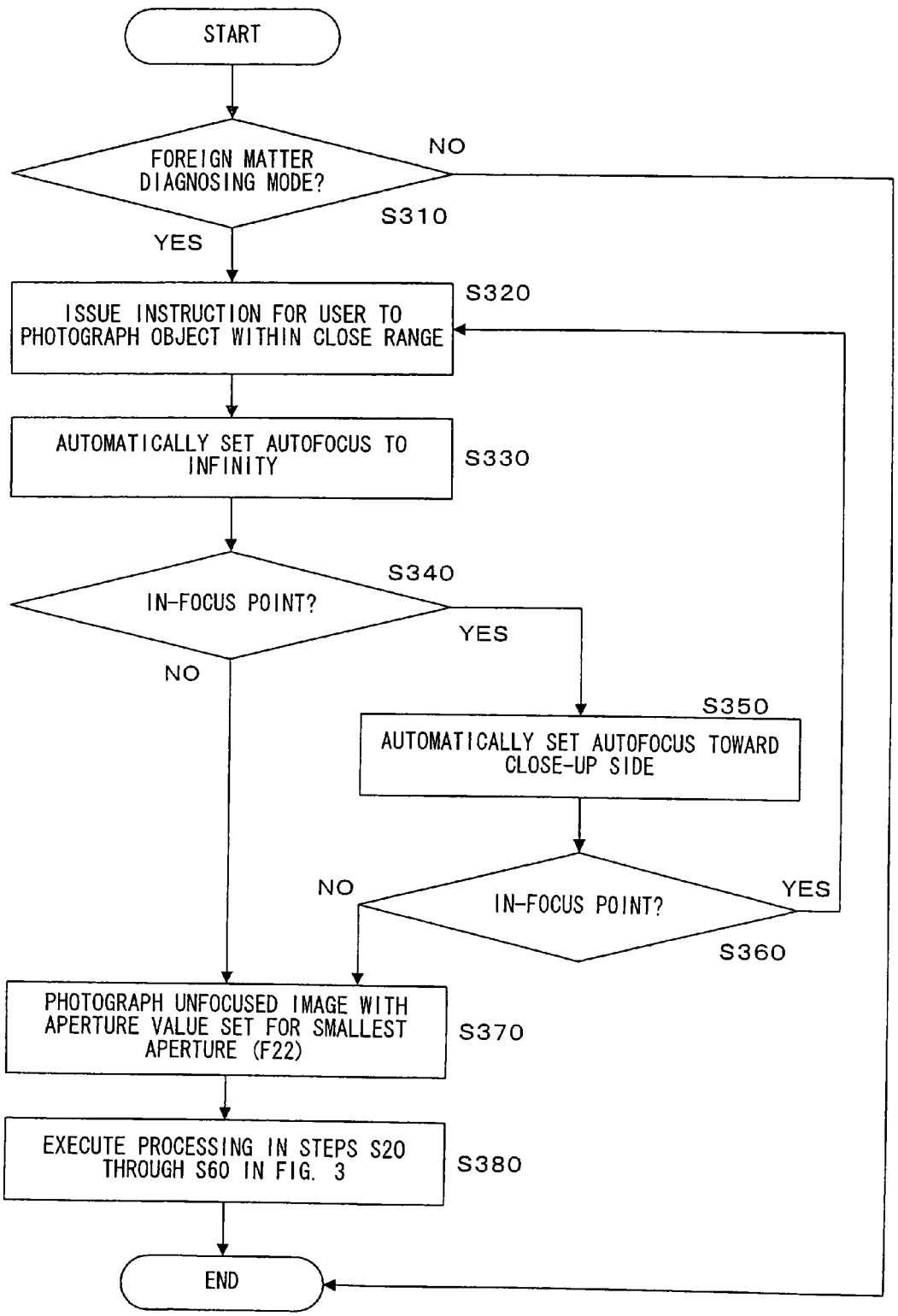
FIG. 9 presents a flowchart of unfocused image photograph processing executed in a third embodiment.

In reference to FIG. 9, the processing executed to monitor the foreign matter built up at the image-capturing surface and diagnose the extent of foreign matter buildup is explained. FIG. 9 presents a flowchart of the processing executed to diagnose the extent of foreign matter buildup at the image-capturing surface based upon the unfocused image having been obtained through photographing operation and to issue a notification for the user if the extent of foreign matter accumulation exceeds the limit beyond which problems occur in regular operation. The processing described below is executed in conformance to a program stored in the memory 18 of the electronic camera 1.

1) Photographing Unfocused Image

Following step S310, in which a decision is made as to whether or not the foreign matter diagnosis mode is currently set, an unfocused image is photographed through the procedure described below. As in the first and second embodiments, the unfocused image should be photographed with the aperture set to the smallest possible opening within the variable range available in the variable optical system 3.

In step S320, the electronic camera 1 issues an instruction for the user to photograph an object present within close range. Since this instruction can be provided as in step S220 in FIG. 8 in the second embodiment, an explanation thereof is omitted.

In step S330, the electronic camera 1 automatically selects "infinity" for autofocus via the autofocus control unit. Since an instruction for photographing the object present within close range has been issued for the user in step S320, an unfocused image, which is unfocused to begin with and is further blurred through focal point control along the opposite direction relative to the subject, can be photographed.

Following step S330, if it is decided in step S340 that there is no in-focus point, an unfocused image can now be photographed and, accordingly, an unfocused image is photographed in step S370. If, on the other hand, it is decided in step S340 that there is an in-focus point, i.e., if an in-focus state has been achieved even though the autofocus has been adjusted toward the out-of-focus side, an unfocused image to be used to monitor the extent of foreign matter buildup cannot be photographed. Such an eventuality may occur if the user photographs an object present over a significant distance despite the instruction to photograph the object present within close range.

In such a case, the operation proceeds to step S350 in which the electronic camera 1 automatically sets the autofocus toward the side opposite from the infinity side, i.e., toward the close-up side (minimum photographing distance side) via the autofocus control unit. If it is decided in the following step S360 that there is no in-focus point, then an unfocused image can now be photographed and, accordingly, the operation proceeds to step S370 to photograph an unfocused image. If, on the other hand, an in-focus state is still achieved, the operation returns to step S320 to issue another instruction for the user to photograph an object present within close range and the processing is re-executed. During this process, the electronic camera may provide the user with a message indicating that an unfocused image has not been photographed and may modify the contents of the instruction issued in step S320 for the retry so as to photograph another object present within close range different from the object having been previously photographed.

Based upon the unfocused image obtained through the procedure described above, the extent of foreign matter buildup is detected and the user is provided with a cleaning timing notification. Since the unfocused image is equivalent to the reference image used in the first embodiment, as explained above, the subsequent processing is identical to the processing executed in the first embodiment. Namely, the extent of foreign matter buildup is detected and the user is provided with a cleaning timing notification by generating a luminance plane in step S20, generating a transmittance map in step S30, monitoring the extent of foreign matter buildup in step S40, making a decision as to whether or not to issue a cleaning timing notification in step S50 and issuing a cleaning timing notification in step S60, as in the first embodiment.

As described above, in the third embodiment in which the autofocus is set toward the opposite side from the infinity side, i.e., toward the close-up side (minimum photographing distance side), via the autofocus control unit if an in-focus state is achieved despite the autofocus adjustment toward the infinity side so as to automatically obtain an unfocused image, an unfocused image can still be obtained even if the user has performed an erroneous operation.

Fourth Embodiment

In the second and third embodiments, an unfocused image is photographed first by issuing an instruction for the user to photograph an object present within close range. However, if a telephoto lens or a micro lens for close-up photographing is used in the variable optical system 3 connected to the electronic camera 1, a desirable unfocused image can be obtained regardless of the distance to the subject to be photographed simply by adjusting the focus position to the end on the exact opposite side from the in-focus point found by autofocus. For this reason, it is not necessary to issue an instruction for the user to photograph an object present within close range. Accordingly, a method of control executed to automatically obtain an unfocused image without the electronic camera 1 issuing an instruction for the user to photograph an object present within close range when a specific type of variable optical system 3 is connected with the electronic camera, is explained in reference to the fourth embodiment.

(Structures of Electronic Camera and Personal Computer)

The electronic camera 1 and the PC 31 functioning as an image processing apparatus adopt structures identical to those in the second embodiment, and for this reason, their explanation is omitted.

In this embodiment, an unfocused image is obtained by adjusting the focus lens position via the autofocus control unit from the autofocus position to an out-of-focus position on the opposite side, i.e., from the autofocus position to a position, either toward the infinity side or the close-up side, without issuing an instruction for the user with regard to an object to be photographed.

(Foreign Matter Monitor Processing)

Figure 10:
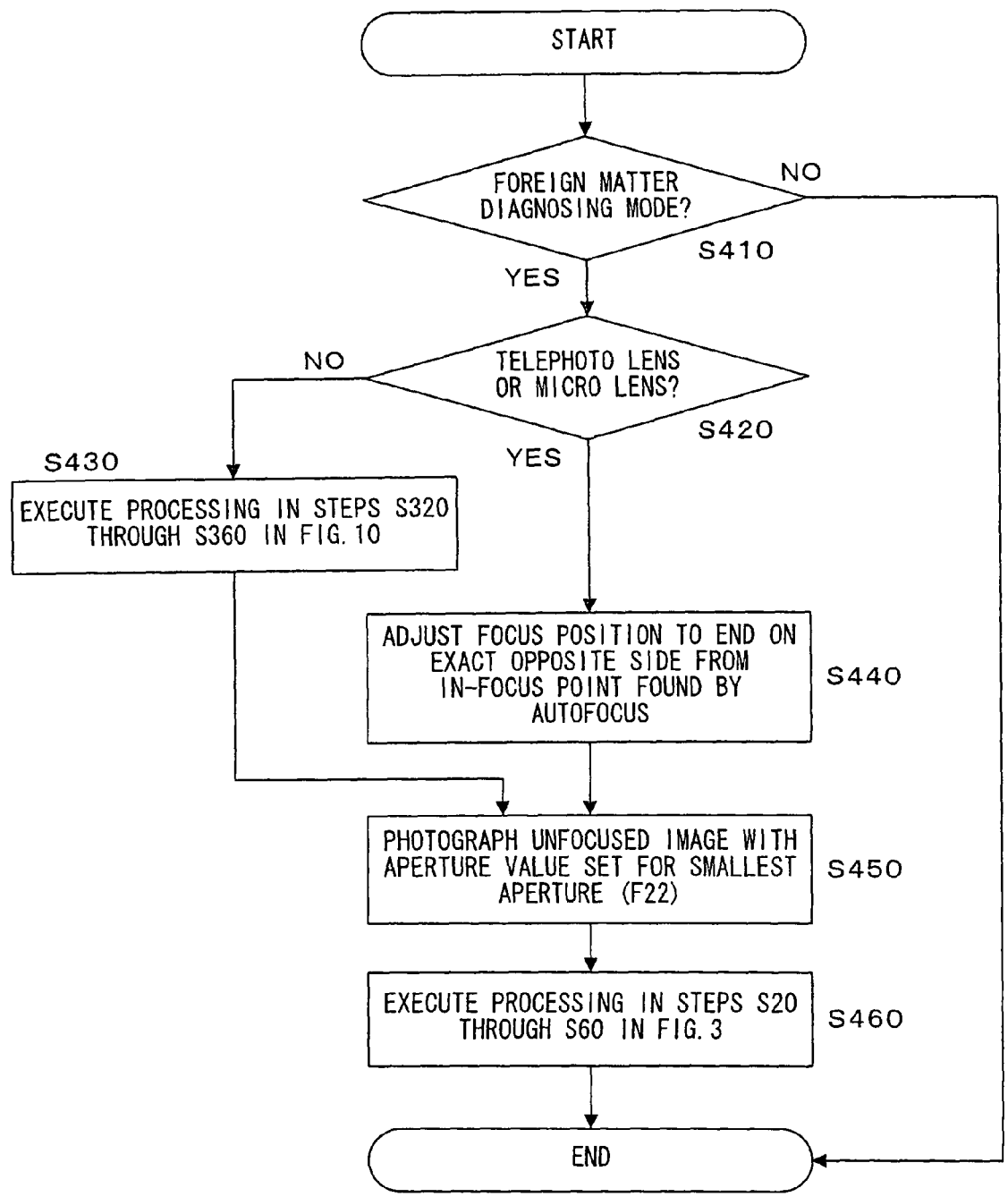
FIG. 10 presents a flowchart of unfocused image photograph processing executed in a fourth embodiment.

In reference to FIG. 10, the processing executed to monitor the foreign matter built up at the image-capturing surface and diagnose the extent of foreign matter buildup is explained. FIG. 10 presents a flowchart of the processing executed to diagnose the extent of foreign matter buildup at the image-capturing surface based upon the unfocused image having been obtained through photographing operation and to issue a notification for the user if the extent of foreign matter accumulation exceeds the limit beyond which problems occur in regular operation. The processing described below is executed in conformance to a program stored in the memory 18 of the electronic camera 1.

1) Photographing Unfocused Image

Following step S410, in which a decision is made as to whether or not the foreign matter diagnosis mode is currently set, an unfocused image is photographed through the procedure described below. The unfocused image should be photographed, with the aperture automatically set for the smallest aperture opening within the variable range available in the variable optical system 3, as in the first, second and third embodiments.

In step S420, a decision is made as to whether or not the variable optical system 3 connected to the electronic camera 1 is constituted with a telephoto lens or a micro lens used for close-up shooting. This decision may be made based upon information indicating the type of the connected lens, which is transmitted from the variable optical system 3 to the control unit 17 of the electronic camera 1 via the mount unit 9 at the camera body 2. If it is decided in step S420 that the variable optical system 3 connected to the electronic camera 1 is not a telephoto lens or a micro lens for close-up shooting, the operation proceeds to step S430. In this situation, an instruction for the user to photograph an object present within close range must be issued, as in the second and third embodiments. Since the processing executed in step S430 is identical to that executed in steps S320 through S360 in the third embodiment, as shown in FIG. 9, its explanation is omitted. On the other hand, if it is decided in step S420 that the variable optical system 3 connected to the electronic camera 1 is either a telephoto lens or a micro lens for close-up shooting, the operation proceeds to step S440 to execute the following processing.

In step S440, control is implemented so as to adjust the focus position of the variable optical system 3 to the end on the exact opposite side from the in-focus point found by autofocus. A desirable unfocused image can be obtained if the variable optical system 3 connected to the electronic camera 1 is constituted with a telephoto lens or a micro lens for close-up shooting simply by adjusting the focus position to the end on the exact opposite side from the in-focus point found by autofocus regardless of the distance to the object being photographed, as explained earlier. Thus, an unfocused image photographing condition is achieved and an unfocused image is photographed in step S450. As described above, an unfocused image can be obtained without having to issue an instruction for the user to photograph an object present within close range in the embodiment.

Based upon the unfocused image obtained through the procedure described above, the extent of foreign matter buildup is detected and the user is provided with a cleaning timing notification. Since the unfocused image is equivalent to the reference image used in the first embodiment, as explained above, the subsequent processing is identical to the processing executed in the first embodiment. Namely, the extent of foreign matter buildup is detected and the user is provided with a cleaning timing notification by generating a luminance plane in step S20, generating a transmittance map in step S30, monitoring the extent of foreign matter buildup in step S40, making a decision as to whether or not to issue a cleaning timing notification in step S50 and issuing a cleaning timing notification in step S60, as in the first embodiment.

As described above, in the fourth embodiment, control is executed to adjust the focus position to the end on the exact opposite side from the in-focus point found by autofocus regardless of the distance to the object being photographed if the variable optical system 3 connected to the electronic camera 1 is a telephoto lens or a micro lens for close-up shooting. Thus, greater ease and convenience in foreign matter detection is realized for the user without having to issue an instruction for the user to photograph an object present within close range to obtain an unfocused image. It is to be noted that the present invention as achieved in this embodiment, which is most effective adopted in conjunction with a telephoto lens or a micro lens for close-up shooting used as the variable optical system 3 connected to the electronic camera 1, may also be adopted in conjunction with a standard lens.

Variations of Embodiments

It is to be noted that after photographing the reference image as explained in "1) Photographing reference image" of the first embodiment or photographing the unfocused image as explained in "1) Photographing unfocused image" of the second through fourth embodiments in the electronic camera 1, the processing in 2) through 5) may be executed on the PC side by taking the photographed image into the PC 31. In such a case, the reference image or the unfocused image having been photographed in the electronic camera 1 is provided to the PC 31 via the memory card 30. Alternatively, it may be provided to the PC 31 via the external interface 23 and a specific cable or a wireless transmission path.

The PC having taken in the reference image or the unfocused image then functions as an image-capturing system diagnostic device (or apparatus) which executes the processing in 2) through 4) as explained in reference to the first through fourth embodiments in conformance to a preinstalled image-capturing system diagnostic program. Then, based upon the results of the processing, it executes the processing in 5) as explained in reference to the first through fourth embodiments and if it is judged that the extent of the foreign matter accumulation exceeds the limit beyond which problems arise in regular operation, it displays a message at the monitor 32 prompting cleaning of the electronic camera with which the image has been photographed. In this case, a diagnosis on the extent of foreign matter accumulation can be executed on the PC 31 after taking the image into the PC 31.

Figure 12:
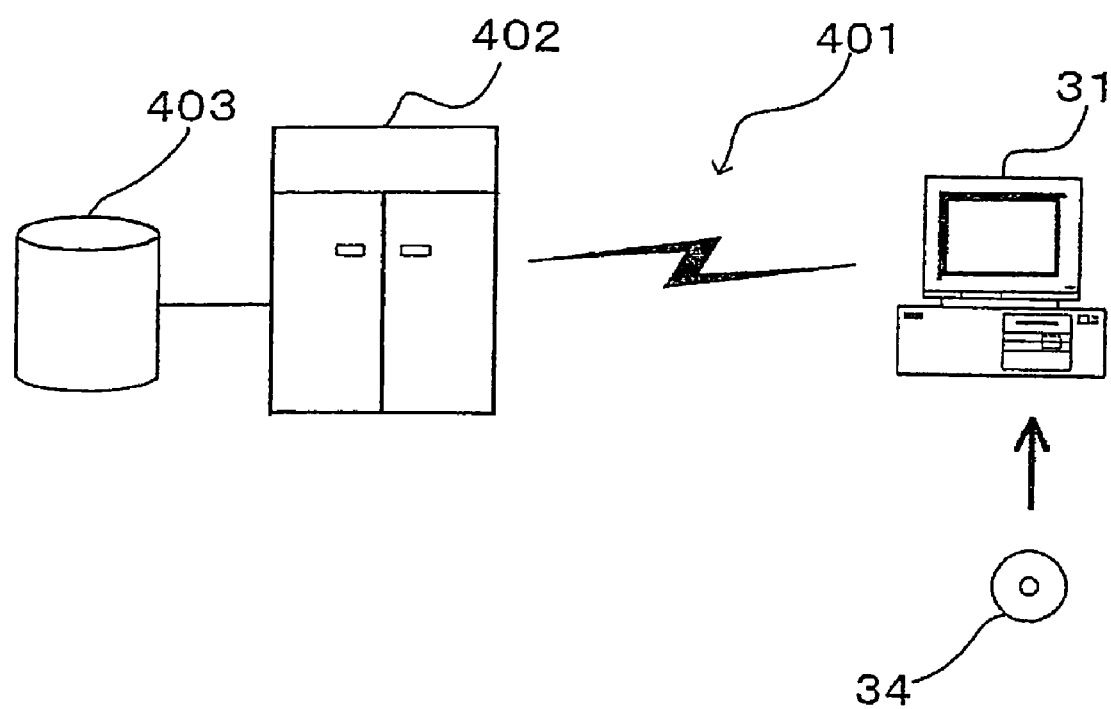

The program executed at the PC 31 may be provided in a recording medium such as a CD-ROM or through a data signal on the Internet or the like. FIG. 12 shows how this may be achieved. The PC 31 receives the program via a CD-ROM 34. In addition, the PC 31 is capable of achieving a connection with a communication line 401. A computer 402 is a server computer that provides the program stored in a recording medium such as a hard disk 403. The communication line 401 may be a communication network for Internet communication, personal computer communication or the like, or it may be a dedicated communication line. The computer 402 reads out the program from the hard disk 403 and transmits the program thus read out to the PC 31 via the communication line 401. Namely, the program embodied as a data signal on a carrier wave is transmitted via the communication line 401. Thus, the program can be distributed as a computer-readable computer program product adopting any of various modes including a recording medium and a carrier wave.

Through the foreign matter buildup extent diagnoses executed in the first through fourth embodiments, as described above, the extent of foreign matter buildup can be diagnosed with ease based upon a reference image or an unfocused image having been photographed. In addition, the foreign matter detection can be executed with greatly improved sensitivity compared to that of the foreign matter detection in the related art.

Furthermore, the present invention makes it possible to execute diagnosis by accurately evaluating the extent of foreign matter accumulation, which can greatly compromise the quality of the image and to prompt physical cleaning whenever necessary. Thus, it is ensured that the image quality does not become lowered without the user being aware of it. The user is not required to perform such diagnosis.

It is to be noted that while in the first embodiment described above, the photographer photographs an image considered to be almost uniform as the reference image in order to create a transmittance map and the transmittance map is generated through local standardization processing and the like executed on the photographed reference image. However, the subject to be photographed as the reference image, which is substantially uniform in the photographer's opinion, may actually contain small patterns or the like. In such a case, the reference image should be photographed basically by defocusing the subject. For instance, a sheet of paper being photographed to obtain the reference image may be photographed by placing it at a position closer to the camera than the minimum photographing distance of the lens. Even if small patterns are present, by defocusing the image so that the patterns change very gently over a range greater than the $(2a+1)\times(2b+1)$-pixel-number gain extraction kernel, a highly usable, substantially uniform reference image can be obtained.

In addition, while an explanation is given above in reference to the embodiments on an example in which the present invention is adopted in conjunction with a Bayer array RGB colorimetric system, it goes without saying that the present invention may be adopted in conjunction with any color filter array, as long as the data ultimately undergo interpolation processing. The present invention may also be adopted with equal effectiveness in conjunction with other calorimetric systems (e.g., a complementary color colorimetric system).

Furthermore, while an explanation is given above in reference to the embodiments on an example in which the present invention is adopted in a single-lens reflex electronic still camera that allows the use of exchangeable lenses, the present invention is not limited to this example. The present invention may be adopted in, for instance, cameras that do not allow the use of exchangeable lenses. The pupil position and the aperture value of the lens can be ascertained as necessary through a method in the known art.

While an explanation is given above in reference to the electronic still camera 1, the present invention is not limited to this example. The present invention may be adopted in a video camera which handles dynamic images. In addition, the present invention may be adopted to process image data photographed with a portable telephone equipped with a camera or the like. It may also be adopted in copiers and scanners as well. In other words, the present invention may be adopted to process all types of image data captured with image sensors.

While an explanation is given above in reference to the embodiments on an example in which the extent of foreign matter buildup is judged through processing executed at the electronic camera 1 or the PC (personal computer) 31 on image data having been photographed with the electronic camera 1, the present invention is not limited to this example. A program that enables such processing may also be installed in a printer, a projector or the like. In other words, the present invention may be adopted in all types of devices (or apparatuses) that handle image data.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention.

What is claimed is:

1. An image-capturing system diagnostic device, comprising:
    an image acquisition unit that obtains an image photographed in an out-of-focus state through an optical system by setting a focusing point (1) at infinity when capturing an image of nearby subjects or (2) to a nearest when capturing an image of infinity subjects to obtain an unfocussed, blurred image of subjects and also by setting an aperture of the optical system to a smallest opening within a variable range available in the optical system, when obtaining the image for monitoring foreign matter present in an optical path; and
    a monitoring unit that monitors the foreign matter present in the optical path based upon the image obtained by the image acquisition unit.

2. An image-capturing system diagnostic device according to claim 1, wherein:
    the image acquisition unit includes an image sensor and an optical component disposed in front of the image sensor toward the optical system; and
    the foreign matter monitored by the monitoring unit is present on a surface of the optical component facing toward the optical system.

3. An image-capturing system diagnostic device according to claim 2, wherein:
    the optical component is an optical filter.

4. An image-capturing system diagnostic device according to claim 1, wherein:
    the smallest opening approximately corresponds to F22.

5. An image-capturing device, comprising:
    an image-capturing unit that captures an image of a subject through an optical system;
    a mode setting unit that selects a foreign matter monitoring mode for monitoring foreign matter within an optical path extending from the optical system to the image-capturing unit;
    an instructing unit that issues an instruction for a photographer to capture an image of a subject within a close range around which the optical system cannot provide any in-focus state for photographing to obtain an unfocussed, blurred image of the subject when the foreign matter monitoring mode is selected;
    a focusing point control unit that sets a focusing point of the optical system to infinity setting when the foreign matter monitoring mode is selected;
    an aperture setting unit that sets an aperture of the optical system to a smallest opening within a variable range available in the optical system when the foreign matter monitoring mode is selected; and
    a monitoring unit that monitors the foreign matter based upon an image obtained by the image-capturing unit by capturing an image of a subject within a close range with the focusing point of the optical system set at the infinity setting when the foreign matter monitoring mode is selected.

6. An image-capturing device according to claim 5, further comprising:
    an optical component disposed in front of the image-capturing unit toward the optical system; and
    the foreign matter monitored by the monitoring unit is present on a surface of the optical component facing toward the optical system.

7. An image-capturing device according to claim 6, wherein:
    the optical component is an optical filter.

8. An image-capturing device according to claim 5, wherein:
    the smallest opening approximately corresponds to F22.

* * * * *